March 12, 1940.    C. H. WHITE    2,192,948
PLANTER
Filed March 25, 1939    2 Sheets-Sheet 2
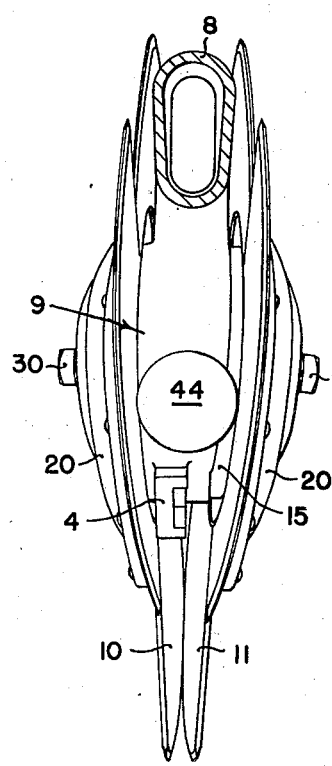
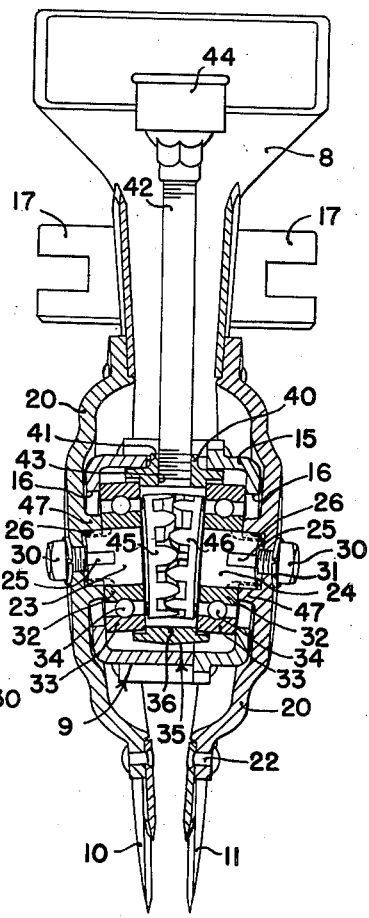
INVENTOR
CHARLES H. WHITE.
BY
ATTORNEYS Patented Mar. 12, 1940

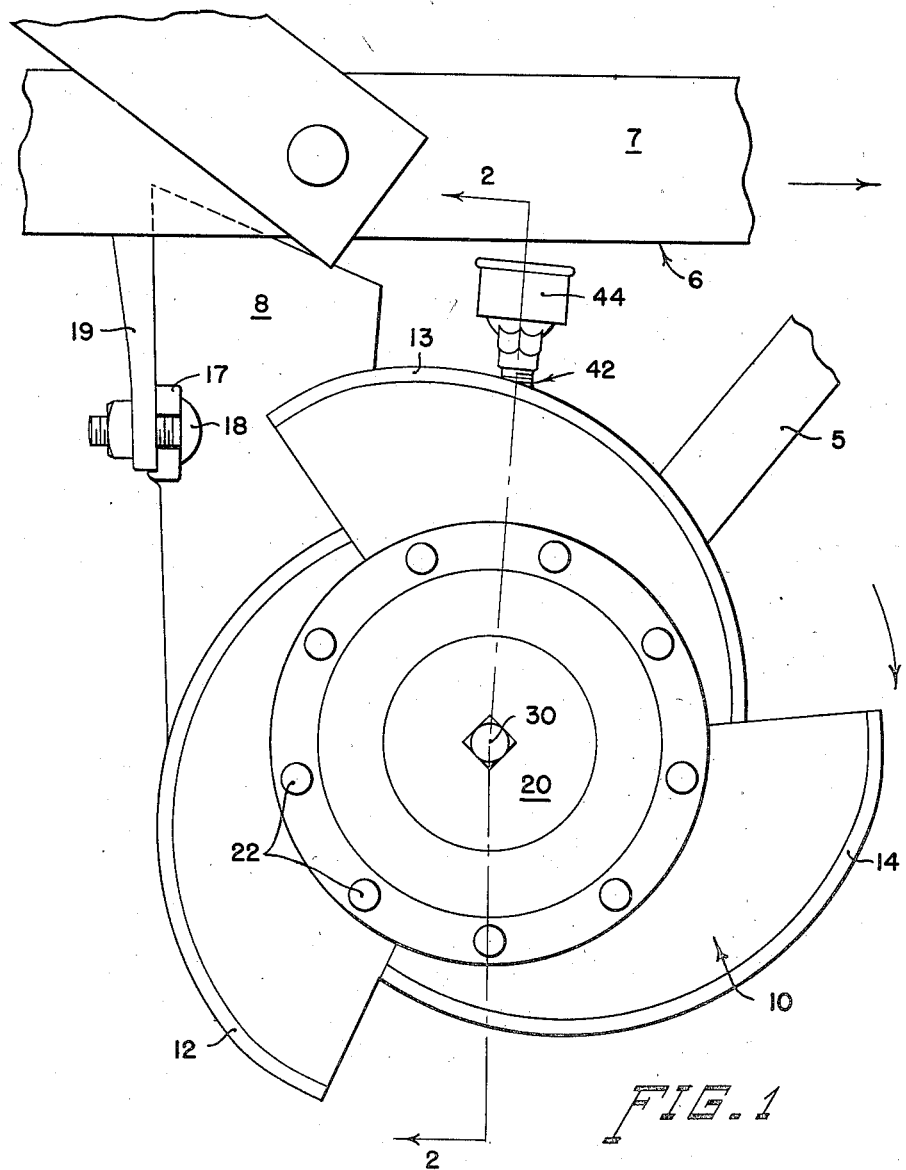

2,192,948

UNITED STATES PATENT OFFICE 2,192,948

PLANTER

Charles H. White, Moline, Ill., assignor to Deere & Company, Moline, Ill., a corporation of Illinois Application March 25, 1939, Serial No. 264,057

11 Claims. (Cl. 97—218)

The present invention relates to planters, and more particularly to furrow openers adapted for use with variable depth planters.

The principal object of the present invention is to provide an improved furrow opener of simplified construction having two disks disposed at an angle to one another such that the leading or ground-entering edge of each disk is conjugate with the corresponding edge of the companion disk and cooperates therewith in cutting a furrow, said corresponding edges spreading apart as the disks complete their revolution, to open the furrow and keep clods of dirt from disturbing or falling into the furrow while being formed.

Another object of the invention is to provide a variable depth furrow opener with a pair of disks rotatably supported on opposite sides of a support housing, and flexible coupling means enclosed within the housing for coupling the disks together, causing them to rotate in unison and in constant angular relation so that the corresponding edges retain constant registration.

A further object of the present invention is the provision of heavy hubs on the variable depth furrow opener disks which serve, in effect, as fly-wheels to carry the disks around through the shallow digging portion of each revolution when the traction of the disks is relatively small.

These and other objects and advantages of the present invention will become apparent after consideration of the following detailed description of a preferred embodiment thereof, reference being had to the accompanying drawings, in which:

Figure 1 is a side elevational view of my improved variable depth furrow opener mounted on the frame of a conventional form of planter;

Figure 2 is a vertical cross sectional view, taken substantially along the plane of the line 2—2 of Figure 1; and Figure 3 is a plan view of the furrow opener, showing the manner in which the edges of the disks come together as they enter the ground and then spread apart to open the furrow as the disks continue their rotation.

This invention embodies improvements over the general type of variable depth planter shown and described in my co-pending application, Serial No. 59,646, filed January 18, 1936, and reference may be had to said co-pending application for certain typical details of construction.

In the drawings, the main frame of the planter is indicated generally by the reference numeral 6 and includes a fore and aft extending beam 7 adapted to be connected at one end thereof to suitable draft means and preferably, although not necessarily, supported in part on ground wheels (not shown). Suitably supported on the main frame is the usual seed hopper and seed dropping mechanism (not shown) which delivers the seed to the spout 8 in a manner well known in the art.

The furrow opener with which the present invention is more particularly concerned comprises a support housing, preferably cast integral with the seed spout 8 at the lower end thereof, and indicated in its entirety by the reference numeral 9. The furrow opener is mounted on the frame 6 by means of two laterally extending bracket portions 17 cast integral with the seed spout 8, said bracket portions being secured by bolts 18 to a member 19 fixed to and extending downwardly from the beam 7. A diagonal brace member 5 is fixed to a bracket 4 on the housing 9 and extends upwardly and forwardly therefrom to connect with the beam 7. Disposed on opposite sides of the housing 9 in fixed angular relation to one another, are two disks 10 and 11, so arranged that the edges of the disks are conjugate with each other at the point at which the disks enter the ground, whereby they cut a furrow and, as the cooperating edges spread apart in completing their revolution, they function as a heel to open the furrow and keep clods of earth from disturbing the furrow while it is being formed. Each of the disks 10, 11 is preferably made up of a number of separate shoes 12, 13 and 14 secured, as by rivets 22 or the like, to hub members 20, and these shoes are formed as involute curved cutting edges disposed uniformly around the periphery of the disk and corresponding to the desired variation in the depth of planting. While in the illustrated construction I have shown each of the disks as of composite construction having three sections or cutting edges, it will be understood that the disks may be formed in one piece, and the number of cutting edges may be varied, as may also the diameter of the disks, depending on the spacing desired between corresponding planting depths. It is not intended, therefore, to limit the present invention to the specific construction shown and described in the accompanying drawings, as the invention in its broader aspects covers the use of disks or the equivalent of various diameters with corresponding variations in the number of such uniformly spaced, curved cutting edges or divisions.

As best shown in Figure 2, one wall of the housing 9 is in the form of a cap 15 which is riveted, or otherwise fixedly secured to the housing 9 and which facilitates the assembly of the various units within the housing. The side wall of the housing 9 and the cap 15 are each provided with openings 16 through which the axles of the disks 10 and 11 extend, as will appear hereinafter.

The two disks 10 and 11 forming the furrow opener of the present invention are held in constant angular relation to each other so that corresponding edges of the disks retain constant registration at all times, and the means for mounting the disks and so holding them will now be described.

The hub members 20 are disposed closely adjacent the side walls of the housing 9 and serve to close the openings 16 to seal lubricant into the housing and prevent dirt from entering therein. These hub members 20 are preferably of relatively large diameter and thick cross section, and act as flywheels, storing up momentum while the deep-digging points of the disks are in the ground and traction is good, and releasing the stored up momentum to help keep the disks rotating when the shallow-digging portion of the disks is in the ground and the traction is less.

Fixedly secured to each of the hub members 20 and extending into the housing 9 through the openings 16 are axle members 23 and 24. The outer end of each axle member has splines 25 which engage companionate splines in a socket 26 provided in the hub member 20, for keying the hub and axle member together. A bolt 30 is passed through a central hole in the hub member 20 and is threaded into the end of the axle member to hold the hub on the axle, said bolt being locked by a lock washer 31. The axle members 23 and 24 are rotatably supported on the housing 9 by suitable bearing means which, in the preferred embodiment illustrated herein, take the form of ball bearings having inner races 32, outer races 33, and balls 34 disposed therebetween. The inner races 32 are fixedly secured on the axle members 23, 24 in a manner to be described hereinafter, while the outer races 33 are non-rotatably supported in the housing 9 at an angle to one another such that the disks 10, 11 are held in proper angular relation to each other. In the preferred construction, the outer races 33 are clamped between the side walls of the housing 9 and a ring member 35 disposed within the housing. As best shown in Figure 2, the side walls of the housing are disposed at an angle to one another substantially parallel to the planes of their respective disks, and the ring member 35 is wedge-shaped, with its sides parallel to the side walls of the housing 9. Thus, the dihedral angle between the disks 10, 11 is determined by the angle between the outer bearing races 33 which are positioned, in turn, by the side walls of the housing 9. The inner surface of the ring member 35 is provided with a raised annular ridge or shoulder 36, and the bearing races 33 abut against opposite sides of this shoulder, the entire assembly being clamped together against the side wall of the housing 9 by the cap 15 when the latter is riveted to the housing. The ring member 35 is secured against rotation relative to the housing 9 by means of a raised boss 40 formed on the top thereof, said boss being engaged in a transverse slot 41 in the housing. A pipe 42 for conveying lubricant into the interior of the ring member 35 is threaded into an aperture 43 in the boss 40, and is provided with a grease cup 44 at the upper end thereof.

The two disks 10, 11 are made to rotate in unison with their corresponding cutting edges 12, 13 and 14 in constant registration, by means of a flexible coupling, preferably in the form of beveled gears 45, 46 fixed to or formed integral with the inner or adjacent ends of the axle members 24, 25. The beveled gears 45, 46 are intermeshed and form a positive coupling between the two angularly disposed axles. The beveled gears also serve as shoulders against which the inner bearing races 33 abut, each of said inner races being clamped between its respective bevel gear and a shoulder 47 on the hub member 20 when the bolt 30 is drawn up tight.

The operation of my improved furrow opener is substantially as follows:

As the planter is propelled forwardly, the disks 10, 11 are caused to rotate by their engagement with the earth, and the cutting edges 12, 13 and 14 thereof enter the ground to various depths while the furrow opener as a whole moves in a straight line at a given height above the ground, depending upon the adjustment of the supporting means. Seed is deposited in the furrow immediately behind the furrow opening disks through the seed spout 8, and is then covered by suitable covering means carried on the main frame 6 to the rear of the furrow opener.

What I claim as my invention is:

1. A planter comprising, in combination, a supporting housing having side walls provided with openings therein, a pair of disks disposed on opposite sides of said housing in constant angular relation to each other, axle means fixed to each of said disks and extending inwardly through said openings, bearing means carried by said housing and journaled on said axle means, and flexible coupling means connecting the adjacent ends of said axle means within said housing whereby said disks are made to rotate together.

2. A planter comprising, in combination, a supporting housing having openings provided in the side walls thereof, a pair of disks disposed on opposite sides of said housing, an axle member fixed to each of said disks and extending through said openings, bearing means for each of said axle members comprising inner and outer races, said inner races being fixed to said axles, means within said housing for non-rotatably supporting said outer races at an angle to one another, whereby said disks are maintained in angular relation to each other, and flexible coupling means on one of said axle members operatively engaged with flexible coupling means on the other axle member for causing said disks to rotate in unison.

3. A planter comprising, in combination, a supporting housing, a pair of disks disposed on opposite sides of said housing, an axle member fixed to each of said disks, bearing means journaled on said axle members and carried by said housing whereby said disks are maintained in constant angular relation to each other so as to jointly make a furrow of greater width than the combined thickness of the two individual disks, the peripheral edges of said disks being provided with uniformly spaced irregular ground engaging portions adapted to cut a furrow of variable depth, and means for holding the corresponding edges of said disks in constant lateral registration, said last named means comprising intermeshed gear portions on the adjacent ends of said axle members.

4. A rotatable furrow opener for planters comprising, in combination, a supporting housing having side walls provided with openings therein, a pair of disks disposed on opposite sides of said housing and closely adjacent thereto for closing said openings, an axle member fixed to each of said disks and extending into said housing through said openings, bearing means for each of said axle members comprising inner and outer races, said inner races being fixed on said axles, a ring member disposed within said housing and secured thereto against rotation, said outer bearing races being clamped between said ring member and said housing at an angle to each other for holding said disks in proper angular relation relative to one another, a beveled gear member fixed to each of the adjacent ends of said axle members and intermeshed for providing a flexible coupling between the axles whereby said disks rotate in unison, the edges of the disks being formed to define a plurality of involute curved cutting edges disposed uniformly around the periphery of the disks for cutting a furrow of variable depth.

5. A rotatable furrow opener for planters comprising, in combination, a supporting housing having side walls provided with openings therein, a pair of disks disposed on opposite sides of said housing and closely adjacent thereto for closing said openings, an axle member fixed to each of said disks and extending into said housing through said openings, bearing means for each of said axle members comprising inner and outer races, said inner races being fixed on said axles, a ring member disposed within said housing and secured thereto against rotation, said outer bearing races being clamped between said ring member and said housing at an angle to each other for holding said disks in proper angular relation relative to one another, and flexible coupling means within said housing interconnecting said axle members.

6. A rotatable furrow opener comprising in combination, a housing having openings in the opposing sides thereof, respectively, a pair of axles disposed within said openings and extending into said housing, radial and thrust bearing means disposed within said housing and acting to support said axles for rotation about axes lying at an angle of less than 180° to each other and further acting to retain said axles against axial movement out of said housing, coupling means interconnecting the inner ends of said axles to cause them to rotate together, and ground engaging discs fixed to the outer ends of said axles, respectively, and closing the openings in said housing.

7. A rotatable furrow opener, comprising in combination, a pair of cooperative housing members having openings in the opposing sides thereof, respectively, a pair of axles disposed within said housing in register with said openings, respectively, bearing members in said housing for supporting said axles for rotation about angularly disposed axes, means on said axles inwardly of said bearing members serving as thrust bearings, means securing said housing members together and thereby retaining said axles within said housing, intermeshing means on said axles preventing relative rotary movement therebetween, and a ground engaging disc fixed to the outer end of each of said axles.

8. A rotatable furrow opener, comprising in combination, a pair of cooperative housing members having openings in the opposing sides thereof, respectively, a pair of axles disposed within said housing in register with said openings, respectively, bearing members supported in each of said housing members for carrying said axles for rotation in said housing about angularly disposed axes, a shoulder on each of said axles inwardly of the respective bearing members and abutting against the latter, means securing said housing members together to retain said axles within said housing, and a ground engaging disc mounted on the outer end of each of said axles.

9. A rotatable furrow opener, comprising in combination, a pair of cooperative housing members having openings in the opposing sides thereof, respectively, a pair of axles disposed within said housing in register with said openings, respectively, a clamping ring adapted to fit within said housing, bearing means for said axles including a pair of outer races disposed between said clamping ring and each of said housing members, respectively, said ring and said housing members being shaped to position said races in angularly related planes, and a pair of inner races mounted on said axles, shoulders on said axles inwardly of said races to retain said axles within the housing, intermeshing coupling means connecting the inner ends of said axles, means for securing said housing members together to clamp said bearing means fixedly within the housing, a ground engaging disc disposed on either side of the housing, and securing means extending through said openings for fixing said discs to said axles, respectively.

10. A planter comprising a rotatable furrow opener including a cutting disk disposed at an angle to the line of travel so as to make a furrow of a width greater than the thickness of the disk, the peripheral portion of the disk being formed to cut a furrow of variable depth, and a relatively heavy hub member fixed to said disk for building up momentum when the disk is cutting the deeper portion of the furrow, to assist the rotation of the disk when cutting the shallower portion of the furrow.

11. A rotatable furrow opener comprising a cutting disk disposed at an angle to the line of travel so as to make a furrow of a width greater than the thickness of the disk, the edge of said disk being formed to define a plurality of cutting sections disposed generally uniformly around the periphery of the disk, said sections having parts which are disposed at different radial distances from the axis of rotation of the disk, whereby the furrow cut by said disk comprises portions of different depths, and a relatively heavy hub member fixed to said disk and having a radius slightly less than the radial distance from the axis of the disk to the shallowest cutting portion thereof, said hub acting to store up momentum when traction of the cutting disk is good for assisting the rotation of the disk when traction is poor.

CHARLES H. WHITE.